US009769796B2

(12) United States Patent
Hassan et al.

(10) Patent No.: US 9,769,796 B2
(45) Date of Patent: Sep. 19, 2017

(54) RADIO CHANNEL UTILIZATION

(71) Applicant: Microsoft Corporation, Redmond, WA (US)

(72) Inventors: Amer A. Hassan, Kirkland, WA (US); Paul W. A. Mitchell, Seattle, WA (US); Paul W. Garnett, Albany, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/049,129

(22) Filed: Oct. 8, 2013

(65) Prior Publication Data

US 2015/0098364 A1   Apr. 9, 2015

(51) Int. Cl.
*H04W 72/04* (2009.01)
*H04W 16/14* (2009.01)
*H04L 27/00* (2006.01)
*H04L 5/00* (2006.01)

(52) U.S. Cl.
CPC ............ *H04W 72/04* (2013.01); *H04L 5/003* (2013.01); *H04L 27/0006* (2013.01); *H04W 16/14* (2013.01)

(58) Field of Classification Search
None
See application file for complete search history.

(56) References Cited

U.S. PATENT DOCUMENTS

| 2006/0270439 | A1* | 11/2006 | Banh ................... H04L 27/2602 455/522 |
| 2009/0180406 | A1 | 7/2009 | Breuer et al. |
| 2009/0275356 | A1* | 11/2009 | Chapman .............. H04L 5/0066 455/522 |
| 2010/0002675 | A1 | 1/2010 | Fu et al. |
| 2011/0044191 | A1* | 2/2011 | Calvitti et al. ................. 370/252 |
| 2011/0222493 | A1 | 9/2011 | Mangold |
| 2011/0280238 | A1* | 11/2011 | Kreuzer et al. ............... 370/347 |
| 2012/0063373 | A1* | 3/2012 | Chincholi ............... H04L 5/001 370/281 |
| 2012/0147274 | A1* | 6/2012 | Hassan et al. ................. 348/729 |

(Continued)

FOREIGN PATENT DOCUMENTS

WO   2012109195 A2   8/2012

OTHER PUBLICATIONS

Kim, Mee-Ran, et al., "A Robust Cognitive Radio Based Adaptive Frequency/Time Spreading for OFDM Systems", In Proceedings of IEEE 64th Vehicular Technology Conference—Vtc 2006—Fall, Published on: Sep. 25, 2006, 5 Pages.

(Continued)

*Primary Examiner* — Yaotang Wang
(74) *Attorney, Agent, or Firm* — Rainier Patents, P.S.

(57) ABSTRACT

The concepts relate to radio channel utilization. One example can identify a channel for communicating data. The channel can include a set of sub-channels that span from a lower frequency adjacent channel to a higher frequency adjacent channel. This example can encode the data on the set of sub-channels of the channel in a manner so that an individual sub-channel that is closer to either the lower frequency adjacent channel or the higher frequency adjacent channel than another individual sub-channel has a smaller amplitude than an amplitude of the another individual sub-channel.

20 Claims, 7 Drawing Sheets

(56) References Cited

U.S. PATENT DOCUMENTS

| | | | |
|---|---|---|---|
| 2014/0192848 A1* | 7/2014 | Rao et al. | 375/219 |
| 2015/0111596 A1* | 4/2015 | Ruuska | H04W 16/14 |
| | | | 455/454 |
| 2016/0198471 A1* | 7/2016 | Young | H04W 72/1273 |
| | | | 370/329 |

OTHER PUBLICATIONS

Zhou, et al., "Multiuser Spectral Precoding for OFDM-Based Cognitive Radio Systems", In Proceedings of IEEE Journal on Selected Areas in Communications, vol. 31, Issue No. 3, Published on: Mar. 2013, pp. 345-352.

"International Search Report and Written Opinion," From PCT Patent Application No. PCT/US2014/058507, Mailed Date: Jan. 15, 2015, 11 Pages.

Salameh et al., "Spectrum Bonding and Aggregation with Guard-Band Awareness in Cognitive Radio Networks", IEEE Transactions on Mobile Computing, Jan. 11, 2013.

International Report on Patentability mailed Apr. 21, 2016 from PCT Patent Application No. PCT/US2014/058507, 7 pages.

Communication pursuant to Rules 161(1) and 162 EPC mailed May 18, 2016 from European Patent Application No. 14793343.6, 2 pages.

Response filed Jun. 22, 2016 to the Communication pursuant to Rules 161(1) and 162 EPC mailed May 18, 2016 from European Patent Application No. 14793343.6, 14 pages.

\* cited by examiner

RADIO CHANNEL UTILIZATION

BACKGROUND

Ever increasing numbers of wireless devices are being introduced and sold. As such, the radio frequency (RF) spectrum available for these wireless devices to communicate continues to get more and more crowded. Regulators organize and manage individual channels of the RF spectrum for licensed and/or unlicensed use. Individual channels may be separated by guard channels or guard bands. Guard channels can protect use of adjacent channels from interfering with one another. The present implementations can offer more efficient use of guard bands and/or other channels while still protecting adjacent use.

SUMMARY

The described implementations relate to radio channel utilization. One example can identify a channel for communicating data. The channel can include a set of sub-channels that span from a lower frequency adjacent channel to a higher frequency adjacent channel. This example can encode the data on the set of sub-channels of the channel effective that an individual sub-channel that is closer to either the lower frequency adjacent channel or the higher frequency adjacent channel than a second individual sub-channel has a smaller amplitude than an amplitude of the second individual sub-channel.

Another example can determine whether to use a guard channel with an adjacent channel to communicate data. The example can also determine an allowed power level for the use of the guard channel. The method can further configure sub-channels of the guard channel in descending power order away from the adjacent channel. This can allow an overall power level of the sub-channels to conform with the allowed power level even though individual sub-channels proximate to the adjacent channel exceed the allowed power level.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the Figure and associated discussion where the reference number is first introduced.

DETAILED DESCRIPTION

Overview

This patent relates to utilizing radio channels/frequencies. Wireless communication is increasing over the radio frequency (RF) spectrum. Individual channels of the RF spectrum are regulated for specific purposes. Some channels are reserved for licensed use. Some of these licensed channels are not actually used in a given geographic area and can be utilized by unlicensed users in accordance with various constraints. These channels can be termed 'radio white space channels'. Still other channels are reserved for use by unlicensed users. The use is subject to various regulatory constraints. Other channels known as guard channels are used to buffer use of nearby channels from interfering with one another. Any of the above mentioned channels can be used to transmit signals, with each signal viewed as a set of sub-channels. Generally all sub-channels within a channel have been treated uniformly, such as commonly used in orthogonal frequency division multiplexing (OFDM) transmission of Wi-Fi 802.11a/g/n/ac. The present concepts can handle individual sub-channels differently from one another based upon various factors. Handling individual sub-channels in this way can allow increased data transfer compared to existing configurations.

System Examples

Figure 1:
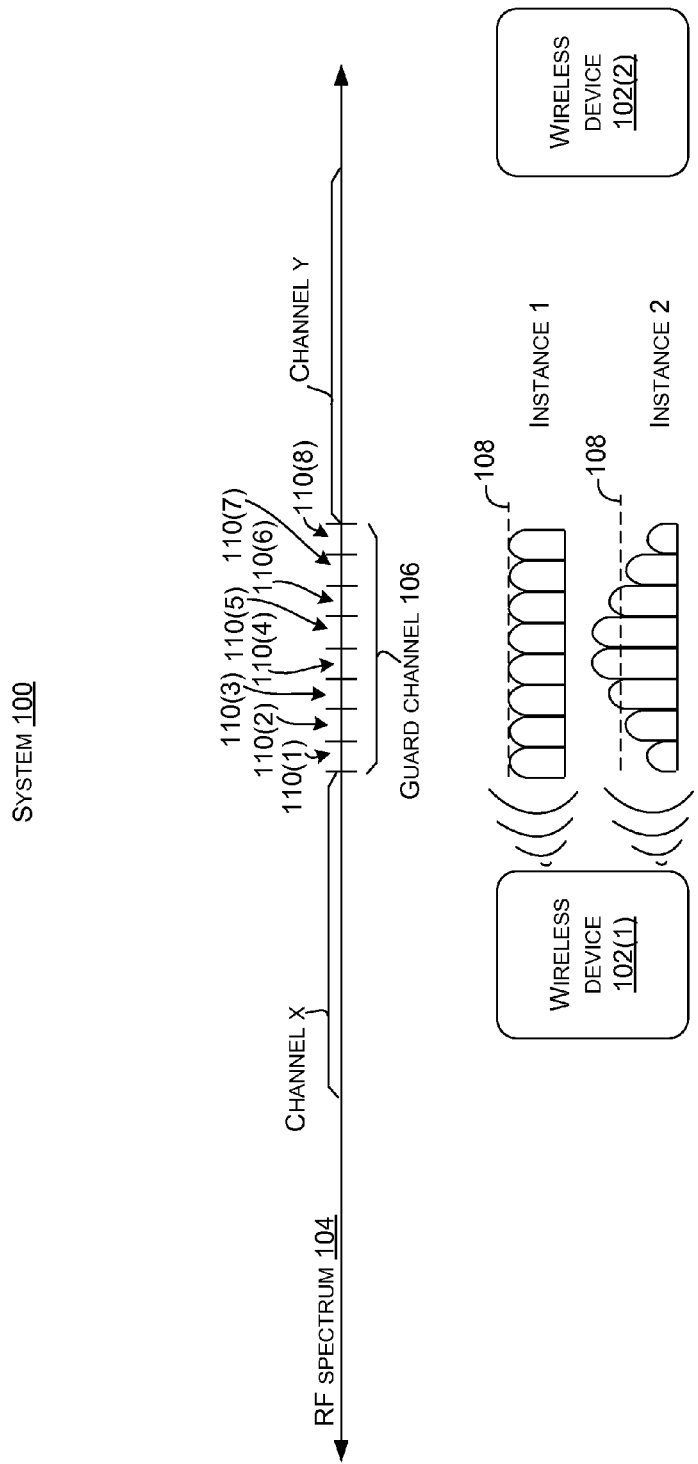
FIGS. 1-5 show example systems in accordance with some implementations of the present concepts.

For purposes of explanation consider introductory FIG. 1, which shows a scenario involving a system 100 that includes a wireless device 102(1) that wants to communicate data, such as to wireless device 102(2). Toward this end, wireless device 102(1) can attempt to identify radio channels that are available for use. For purposes of explanation, a portion of the RF spectrum is represented at 104. In this case, assume that the wireless device 102(1) identifies a guard band or guard channel 106 between channel x and channel y. Further, assume that channel x and channel y are licensed channels that are reserved by a regulatory authority for use by only a licensed user (e.g., not wireless device 102(1)). In this scenario, wireless device 102(1) can use the guard channel 106 subject to regulatory imposed constraints. For instance, any use of the guard channel should not interfere with the licensed use of channel x and/or channel y. Toward this end, any use of the guard channel may be limited to a specific spectrum mask limiting the overall power level 108, such as 40 milli Watts (mW), so that spill over to the adjacent channels (x and/or y) is below a given power spectral density level. Further, use of the guard channel does not include any expectation of protection from interference caused by the licensed use of either channel x or channel y.

Instance 1 and Instance 2 illustrate two ways that wireless device 102(1) can communicate data over guard channel 106 in accordance with the constraints. Each of these Instances involves device 102(1) transmitting on multiple sub-carriers or sub-channels 110 of the guard band 106. In this case, eight sub-channels are designated as 110(1)-110(8). (Of course, other numbers of sub-channels can be used). Signals for individual sub-channels can be calculated utilizing OFDM or other techniques. OFDM is commonly used in most digital communications systems such as LTE/4G cellular, and all recent Wi-Fi technologies. However, the inventive concepts are not restricted to OFDM and can be applied to any multi-carrier per symbol modulation techniques. OFDM is a method of encoding digital data on multiple carrier frequencies (e.g., sub-channels). OFDM can be thought of as a frequency division multiplexing scheme used as a digital multi-carrier modulation method. Coded or encoded as used here refers to the use of forward error correction.

Instance 1 involves communicating on each of the sub-channels 110 at the same power level (e.g., the overall power level 108). Instance 2 is an alternative configuration where power levels (e.g., amplitudes) of the individual sub-channels 110 vary from one another. In this case, power levels of individual sub-channels that are proximate to channel x or channel y have lower amplitudes (e.g., below the overall power level 108). In contrast, individual sub-channels that are farther from either channel x or channel y have higher amplitudes (e.g., above the overall power level 108). For instance, compare sub-channel 110(1), which is proximate to channel x, and sub-channel 110(8), which is proximate to channel y, to sub-channels 110(4) and 110(5), which are more distant from either of channel x and channel y. Sub-channels 110(1) and 110(8) have amplitudes (represented in the vertical direction) that are below the overall power level 108. In contrast, sub-channels 110(4) and 110(5) have amplitudes that are above the overall power level 108.

Individual sub-channels 110 that are proximate to an adjacent channel tend to experience more interference from the adjacent channel than interposed sub-channels that are farther from the adjacent channel. For instance, sub-channels 110(1) and 110(8) are closer to channel x and channel y, respectively, than sub-channels 110(4) and 110(5) are from either channel x and/or channel y. As such, sub-channels 110(1) and 110(8) are less likely to effectively deliver a clear signal (e.g., successfully convey information), such as to wireless device 102(2) than sub-channels 110(4) and/or 110(5). As such, using a higher signal strength on the less interfered sub-channels and a lower signal strength on the more interfered sub-channels can allow more data to be effectively conveyed at the same overall power level in Instance 2 than in Instance 1.

From one perspective, Instance 2 can be thought of as employing dynamically variable OFDM. The dynamic variability can be based upon the relative location of the individual sub-channel within the channel and/or relative amplitudes of other individual sub-channels, among other factors.

In summary, guard channel 106 includes a set of sub-channels 110(1)-110(8) that span from a lower frequency adjacent channel (e.g., channel x) to a higher frequency adjacent channel (e.g., channel y). Data to be transmitted on the guard channel can be encoded on the multiple sub-channels of the guard channel in a manner that an individual sub-channel that is closer to either the lower frequency adjacent channel or the higher frequency adjacent channel than a different individual sub-channel has a smaller amplitude than an amplitude of the different individual sub-channel (e.g., than of individual sub-channels that are more in the middle of the guard channel).

The above mentioned recognition that some sub-channels are exposed to more interference than others can be further addressed in some implementations. For instance, different modulation schemes can be applied to sub-channels depending on relative interference. Lower order modulation tends to be more robust than higher order modulation. In the illustrated example, sub-channels 110(1) and 110(8) can be exposed to higher interference than inner (e.g., more protected) sub-channels 110(3)-110(6). As such, relatively low order modulation can be used on sub-channels 110(1) and 110(8) to help ensure that the signals are successfully conveyed (e.g., an amount of data on the sub-channel is reduced to increase the chance that the data is successfully conveyed despite the interference).

In contrast, inner sub-channels, such as sub-channels 110(3)-110(6) can employ relatively higher order modulation, with higher power per sub-channel. The relatively higher order modulation can offer higher data conveyance than the relatively lower order modulation. This higher data conveyance can be successful due to the lower level of interference experienced at the inner sub-channels. In one such example, outer sub-channels 110(1) and 110(8) could be modulated at a 1 or 2 bit data rate, sub-channels 110(2) and 110(7) could be modulated at a 3 or 4 bit data rate, while inner channels 110(3)-110(6) are modulated at 6 or 8 bit data rate. Viewed from another perspective, phase shift keying, such as binary phase shift keying or quadrature phase shift keying, can be used to modulate the outer sub-channels, while possibly 64 quadrature amplitude modulation (QAM) and 128 QAM, among others, can be used for the inner channels.

Figure 2:
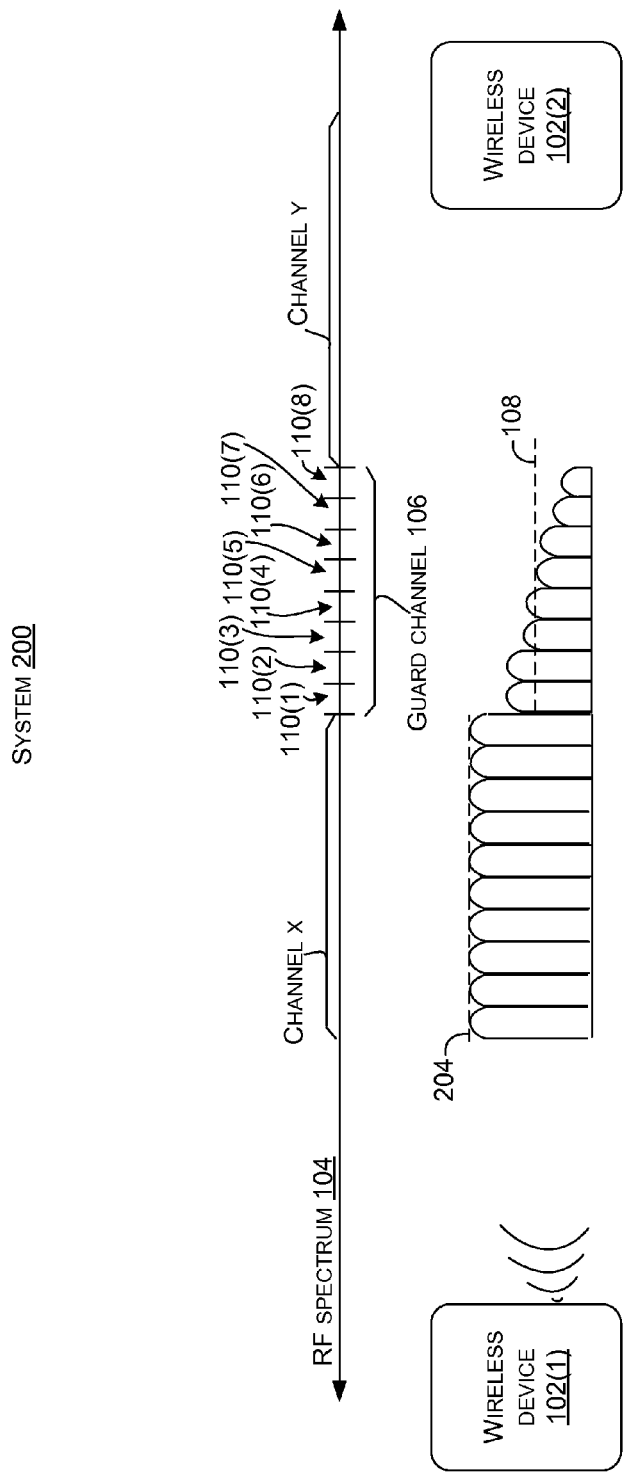

FIG. 2 shows a scenario involving another system 200 that is similar to system 100 of FIG. 1 and retains elements thereof. In this case, assume that wireless device 102(1) is authorized to use channel x. Recall that guard channel 106 separates channel x from channel y. In this case, the wireless device 102(1) can transmit on channel x and can increase its data transfer rate by also utilizing guard channel 106. As mentioned above, use of the guard channel 106 is constrained in that it cannot interfere with licensed use of channel x or channel y. Wireless device 102(1) is authorized to use channel x and can cooperatively utilize the guard channel in a way that does not interfere with its own use as long as it does not interfere with channel y. In this case, wireless device 102(1) can transmit over channel x and the guard channel by utilizing the sub-channels 110(1)-110(8) in an asymmetric manner. For instance, in this case, wireless device 102(1) can transmit over channel x at an allowed overall average power 204. The allowed average power 204 may be the same or different from allowed overall average power 108. Further, in this asymmetric use case, the power level of individual sub-channels 110 in the guard channel 106 decreases with proximity to channel y. This can create a stepped or tapered profile, among others, of the sub-channels 110. In the illustrated example, sub-channels 110(1) and 110(2) are of equal amplitude and the amplitude of the remaining sub-channels 110(3)-110(8) decrease toward channel y. In summary, the guard channel 106 can be operated cooperatively with channel x so interference is not created from that perspective. Further, sub-channels (such as 110(7) and/or 110(8)) proximate to channel y can be operated at low (or zero) amplitudes to decrease any chance of interference with channel y. Thus, again dynamically variable OFDM can be applied to the signal transmitted on individual sub-channels 110 based upon their relative position, amplitude of other sub-channel signals, and/or overall power limits for the guard channel 106.

Stated another way, in this instance wireless device 102(1) can cooperatively communicate data over channel x and guard channel 106. A higher data communication rate can be achieved than with channel x alone or with channel x and the guard channel 106 with all of the sub-channels of the guard channel employing the same amplitude. Despite the increased data transfer rate, the guard channel can conform with the overall power and interference constraints defined above.

Figure 3:
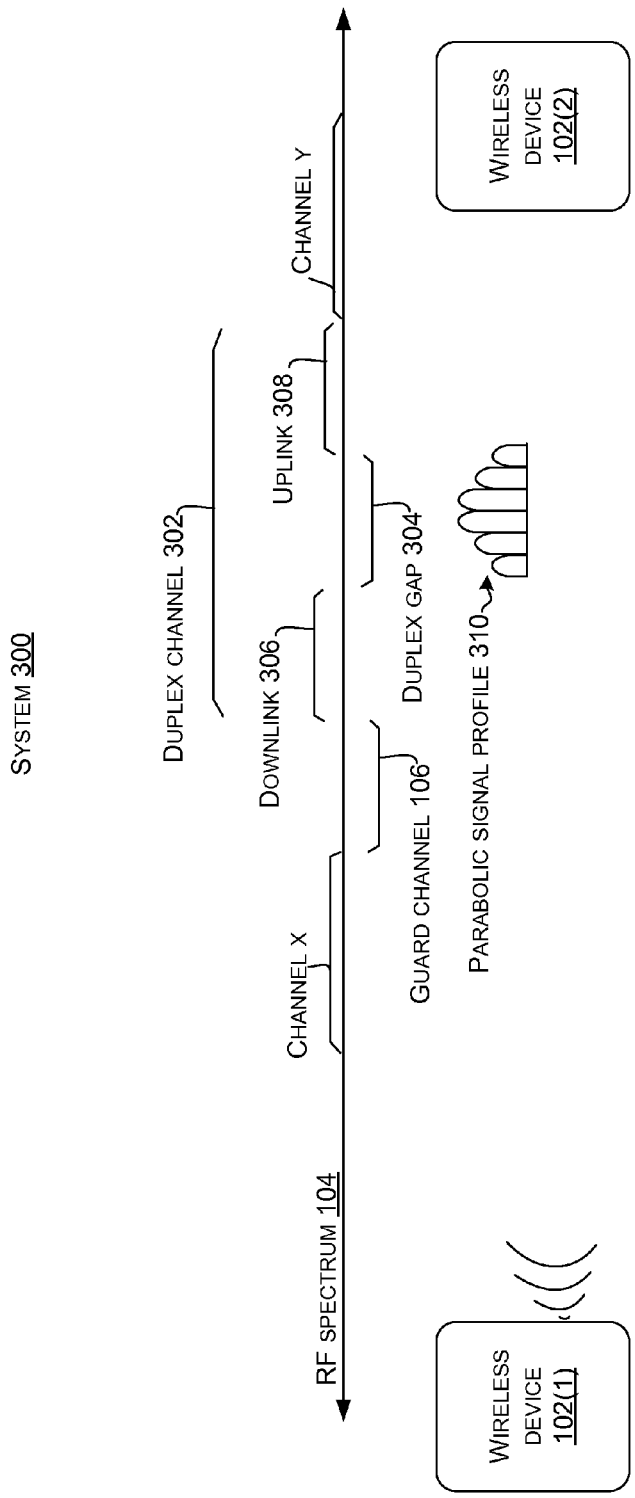

FIG. 3 relates to another system 300. In this case, the labeled RF spectrum includes channel x and channel y as well as a duplex channel 302 positioned between guard channel 106 and channel y. The duplex channel 302 includes a duplex gap 304 separating a downlink 306 from an uplink 308. In this example, wireless device 102(1) can sense the downlink 306 and the uplink 308. When no signals are detected on the uplink and downlink, the wireless device can use the duplex gap 304 as a white space channel by employing dynamically variable OFDM to create a parabolic inter-sub-channel signal profile represented at 310.

It is not uncommon that a device also has an LTE radio. If an LTE signal is detected, the duplex gap 304 can then be used for personal area network (PAN) or LAN use cases where transmit power in the outer sub-channels is low. The device has knowledge to the power levels of the LTE signals and can use it to adapt the power across the sub-channels.

Figure 4:
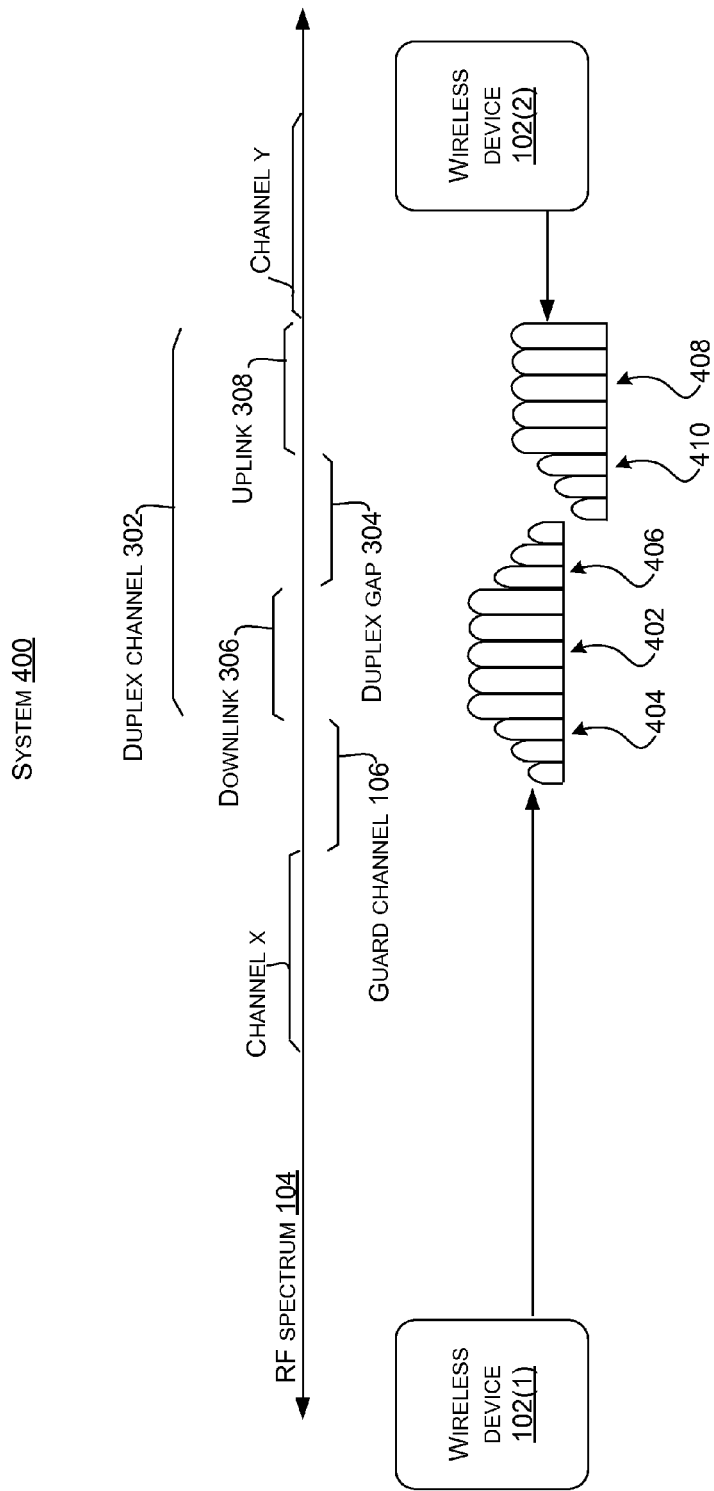

FIG. 4 shows another system 400 that is similar to system 300 of FIG. 3. In this case, assume that the wireless devices 102(1) and 102(2) can utilize the downlink 306 and the uplink 308. In the snapshot captured in the Figure, wireless device 102(1) is transmitting on the downlink 306 as indicated at 402 as well as adjacent sub-channels of guard channel 106 (amplitude decreasing with increasing distance from downlink 306 as indicated at 404. The wireless device 102(1) is also utilizing some of the duplex gap 304 as indicated at 406, also in a manner where sub-channel amplitude decreases with increasing distance from the downlink. In a similar fashion, wireless device 102(2) is utilizing uplink 308 as indicated at 408 and some of duplex gap 304 as indicated at 410. Again, signal strength of the duplex gap sub-channels, utilized by wireless device 102(2), decreases as distance from the uplink increases. This configuration offers greater data transfer rates than traditional usage scenarios without significantly increased interference.

Figure 5:
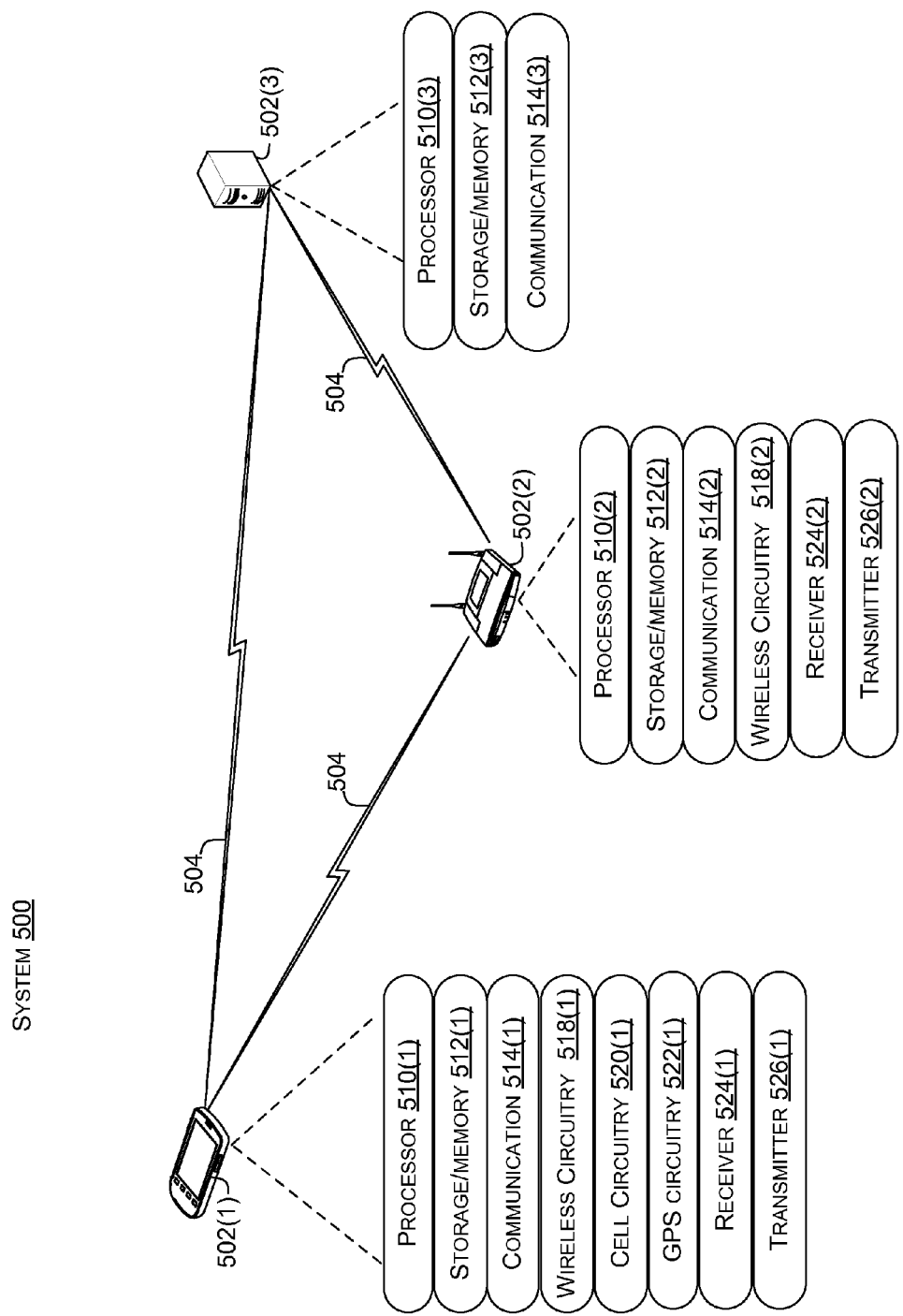

FIG. 5 shows a system 500 that can accomplish dynamically variable sub-channel utilization concepts. Further, system 500 can include multiple devices. In the illustrated configuration, a first device is manifest as a mobile device 502(1), such as a smart phone, tablet, etc. A second device is manifest as a wireless router 502(2). The third device is a computer 502(3), such as a server computer that may be manifest at a defined location or as cloud-based resources. Devices 502(1) and 502(2) can be thought of as further examples of wireless devices 102 described above relative to FIGS. 1-4. The above mentioned devices can communicate via radio channels, as represented by lightning bolts 504, using the present techniques.

The devices 502 can include a processor 510, storage/memory 512, a communication manager or component 514, wireless circuitry 518, cell circuitry 520, global positioning system (GPS) circuitry 522, a receiver 524, and/or a transmitter 526. Not all of these elements need occur on each device. Individual devices can alternatively or additionally include other elements, such as input/output devices (e.g., touch, voice, and/or gesture), buses, displays, graphics cards, etc., which are not illustrated or discussed here for sake of brevity.

For ease of explanation, in this discussion the use of a designator with the suffix, such as "(1)", is intended to refer to a specific element instance relative to a specific device. In contrast, use of the designator without a suffix is intended to be generic. Thus, a discussion of processor 510 is intended to be generic to all of the devices 502(1)-502(3), whereas a discussion of processor 510(1) is intended to be specific to device 502(1). Of course, not all device implementations can be illustrated and other device implementations should be apparent to the skilled artisan from the description above and below.

The term "device", "computer", or "computing device" as used herein can mean any type of device that has some amount of processing capability and/or storage capability. Processing capability can be provided by one or more processors (such as processor 510) that can execute data in the form of computer-readable instructions to provide a functionality. Data, such as computer-readable instructions (e.g., application data) and/or user-related data, can be stored on storage, such as storage/memory 512, that can be internal or external to the computer. The storage can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage medium/media includes "computer-readable storage hardware devices." Examples of computer-readable storage hardware devices include volatile storage media, such as RAM, and non-volatile storage media, such as hard drives, optical discs, and flash memory, among others.

Examples of devices 502 can include traditional computing devices, such as servers, personal computers, desktop computers, notebook computers, cell phones, smart phones, personal digital assistants, pad type computers, mobile devices, wireless devices, cameras, routers, or any of a myriad of ever-evolving or yet to be developed types of computing devices. A mobile computer or mobile device can be any type of computing device that is readily transported by a user and may have a self-contained power source (e.g., battery). Similarly, a wireless device can be any type of computing device that has some capability to communicate with other devices without being physically connected to them. In some cases, a wireless device may have both wireless and wired capabilities. For instance, a router can be physically connected (e.g., wired) to a network, such as with an Ethernet cable, and wirelessly communicate with devices over radio channels, such as radio white space channels and/or Wi-Fi channels, among others.

In the illustrated implementation, devices 502 are configured with a general purpose processor 510 and storage/memory 512. In some configurations, a device can include a system on a chip (SOC) type design. In such a case, functionality provided by the device can be integrated on a single SOC or multiple coupled SOCs. One or more processors can be configured to coordinate with shared resources, such as memory, storage, etc., and/or one or more dedicated resources, such as hardware blocks configured to perform certain specific functionality. Thus, the term "processor" as used herein can also refer to central processing units (CPUs), graphical processing units (GPUs), controllers, microcontrollers, processor cores, or other types of processing devices suitable for implementation both in conventional computing architectures as well as SOC designs. In another example, the receiver 524 and/or the transmitter 526 can be embodied on a SOC as a cognitive radio. A cognitive radio can tune to large portions of the radio spectrum at once. The cognitive radio can then ignore signals on channels that are not of interest.

Wireless circuitry 518 can facilitate communication over various radio channels, such as radio white space channels, Wi-Fi™ channels, Bluetooth™ channels, etc. The cell circuitry 520 can be thought of as a subset of the wireless circuitry relating to cellular radio channels. The cellular circuitry can handle communications over cell data channels and cell control channels. The GPS circuitry 522 can utilize GPS (and/or other global navigation satellite systems) satellite signals to calculate the device's location.

The receiver 524 and the transmitter 526 can function to transmit and receive data at various radio channels. For example, the receiver 524 and the transmitter 526 can be configured to operate at specific radio channels, such as 2.4 gigahertz channels, 5.0 gigahertz channels, 60 gigahertz channels, radio band channels, and/or TV channels (50 megahertz to 810 megahertz), among others. Alternatively, the transmitters and receivers can be configured to tune to any channels or set of channels in the RF spectrum. Transmitter 526 can be configured to transmit at a specific power or a range of powers. For instance, the transmitter can be configured to transmit at 0.01 mill watt (mW) or a range of powers from 0 to 0.01 mW. The transmitter can have different power limits for different channels. For instance, a Wi-Fi transmission power limit may be lower than a TVWS power limit. The receiver 524 can be configured to perform the signal sensing on multiple radio channels at once. Similarly, the transmitter can be configured to transmit on multiple radio channels at once.

While discrete components or elements are illustrated, some implementations may combine elements. For instance, wireless circuitry 518 may include dedicated receivers and transmitters rather than interfacing with distinct receivers 524 and transmitters 526. The wireless circuitry 518, cell circuitry 520, GPS circuitry 522, receiver 524, and/or the transmitter 526 can be hardware based or a combination of hardware and software. The circuitry may utilize a system on a chip (SOC) configuration (described above), such as in the above mentioned cognitive radio.

The communication manager 514 can cause the receiver 524 to tune to specific radio channels and sense for signals. Similarly, the communication manager can cause the transmitter 526 to transmit on specific radio channels.

The communication manager 514 can also cause the transmitter to transmit signals on the radio channels according to the dynamically variable radio channel utilization concepts, such as those described relative to FIGS. 1-4. In one implementation, the communication manager 514 can calculate amplitudes for individual sub-channels utilizing a dynamically variable OFDM technique represented as:

$$ae^{i\phi}$$

where a equals the amplitude, e is a mathematical constant (sometimes referred to as Euler's number), i is an imaginary number, and $\phi$ is the phase of the signal in the sub-channel.

In summary, the communication manager 514 can be configured to identify a guard radio channel between two licensed radio channels. The communication manager can be configured to cause the wireless circuitry 518 to communicate over the guard channel so that an amplitude of signals on first sub-channels of the guard channel that are proximate either of the two licensed radio channels are lower than an amplitude of second sub-channels that are interposed between the first sub-channels.

Another example of the implementation is the case when multiple OFDM signals can be transmitted in one duplex or gap band. For instance, say two OFDM signals are transmitted in one duplex gap. These OFDM signals are S1 and S2. Assume that S1 is transmitted in the lower part of the band and S2 in the upper part. In this case, the power assignments are such that sub-channels of S1 ramp up, and power levels of S2 ramp down. Overall, when both S1 and S2 are viewed as one composite signal with combined sub-channels, the power levels ramp up (starting from the lower band adjacent to one licensed band) to a maximum, then ramp down towards the upper band.

Method Examples

Figure 6:
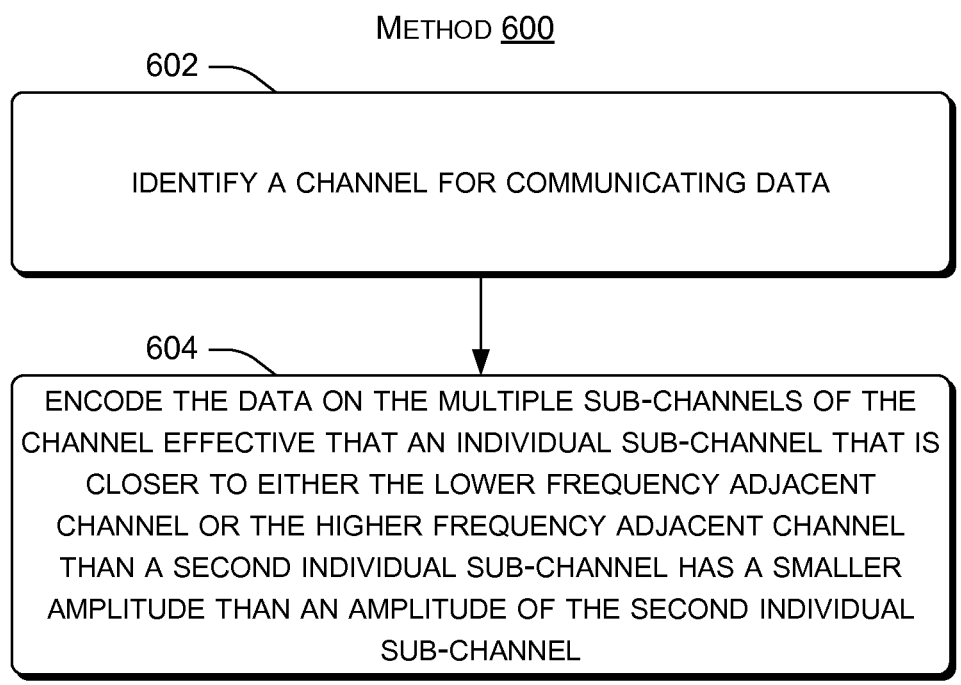
FIGS. 6-7 are flowcharts of example techniques in accordance with some implementations of the present concepts.

FIG. 6 shows a radio channel utilization method 600.

The method can identify a channel for communicating data at 602. The channel can include a set of sub-channels that span from a lower frequency adjacent channel to a higher frequency adjacent channel.

The method can encode the data on the multiple sub-channels of the channel effective such that an individual sub-channel that is closer to either the lower frequency adjacent channel or the higher frequency adjacent channel than a second individual sub-channel has a smaller amplitude than the amplitude of the second individual sub-channel at 604.

Figure 7:
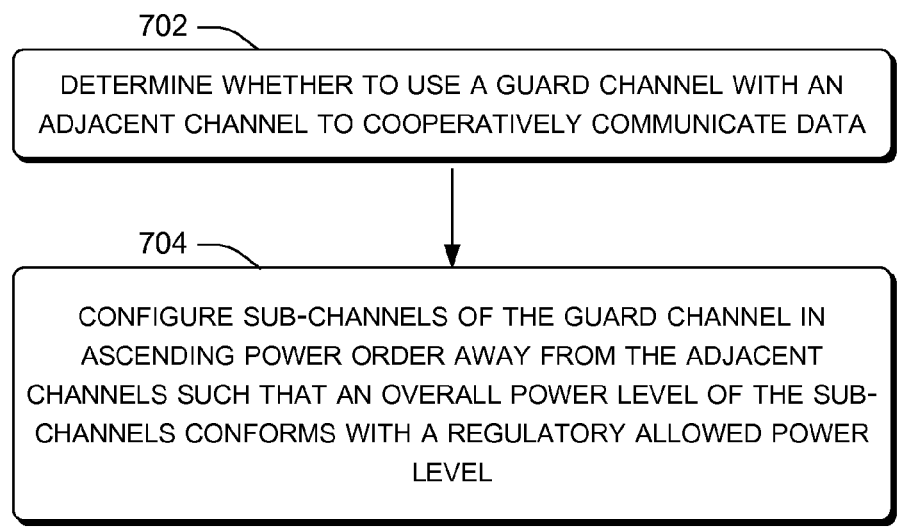

FIG. 7 shows another radio channel utilization method 700.

The method can determine whether to use a guard channel with an adjacent channel to cooperatively communicate data at 702.

The method can configure sub-channels of the guard channel in ascending power order away from the adjacent channels such that an overall power level of the sub-channels conforms with a regulatory allowed power level at 704.

The order in which the example methods are described is not intended to be construed as a limitation, and any number of the described blocks or acts can be combined in any order to implement the methods, or alternate methods. Furthermore, the methods can be implemented in any suitable hardware, software, firmware, or combination thereof, such that a computing device can implement the method. In one case, the method is stored on one or more computer-readable storage media as a set of instructions such that execution by a processor of a computing device causes the computing device to perform the method.

CONCLUSION

Although techniques, methods, devices, systems, etc., pertaining to radio channel utilization are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method for communicating data from a first wireless device to a second wireless device, the method comprising:
   identifying a duplex channel for communicating the data, the duplex channel including a downlink, an uplink, and a duplex gap separating the downlink from the uplink; and
   by the first wireless device, cooperatively encoding and transmitting the data on the duplex gap and the uplink of the duplex channel to the second wireless device by configuring duplex gap sub-channels of the duplex gap with a signal profile such that an individual duplex gap sub-channel that is adjacent to the uplink of the duplex channel has a different amplitude than another duplex gap sub-channel that is not adjacent to the uplink.

2. The method of claim 1, further comprising:
   by the first wireless device, configuring the signal profile such that the individual duplex gap sub-channel that is adjacent to the uplink has a relatively higher amplitude than the another duplex gap sub-channel that is not adjacent to the uplink.

3. The method of claim 1,
   wherein an overall power level of the signal profile conforms with a regulatory allowed power level.

4. The method of claim 1, wherein the downlink consists of relatively lower frequencies than the duplex gap, and the duplex gap consists of relatively lower frequencies than the uplink.

5. The method of claim 1, wherein the encoding comprises forward error correction encoding.

6. The method of claim 1, wherein the encoding comprises performing dynamically variable orthogonal frequency division modulation on each of the duplex gap sub-channels based at least upon relative proximity to the uplink.

7. The method of claim 1, further comprising:
by the first wireless device, configuring the signal profile such that the individual duplex gap sub-channel that is adjacent to the uplink has a relatively lower amplitude than the another duplex gap sub-channel that is not adjacent to the uplink.

8. A system, comprising:
a transmitter adapted to transmit on a duplex gap and a downlink of a duplex channel, the duplex gap separating an uplink of the duplex channel from the downlink of the duplex channel; and
communication circuitry adapted to:
configure respective duplex gap sub-channel amplitudes of duplex gap sub-channels of the duplex gap based at least on respective distances of individual duplex gap sub-channels from the downlink; and
cause the transmitter to cooperatively use the duplex gap and the downlink of the duplex channel together to communicate data to a wireless device by sending a signal encoding the data concurrently on the downlink and the duplex gap, the signal being carried in the duplex gap sub-channels at the respective duplex gap sub-channel amplitudes.

9. The system of claim 8, wherein the communication circuitry is further adapted to configure a signal profile of the signal such that a particular duplex gap sub-channel that is adjacent to the downlink has a relatively higher amplitude than another duplex gap sub-channel that is not adjacent to the downlink.

10. The system of claim 8, wherein the communication circuitry is further adapted to modulate certain duplex gap sub-channels proximate to the downlink at a lower bit rate than other duplex gap sub-channels that are farther from the downlink.

11. The system of claim 8, wherein the communication circuitry is further adapted to configure the duplex gap sub-channels by performing dynamically variable orthogonal frequency division multiplexing on the duplex gap sub-channels based at least upon relative proximity to the downlink.

12. The system of claim 8, wherein the communication circuitry is further adapted to perform forward error correction encoding for the duplex gap sub-channels.

13. The system of claim 8, wherein the communication circuitry is further adapted to configure a signal profile of the signal such that a particular duplex gap sub-channel that is adjacent to the downlink has a relatively lower amplitude than another duplex gap sub-channel that is not adjacent to the downlink.

14. The system of claim 8, wherein the communication circuitry is further adapted to utilize different modulation schemes for different duplex gap sub-channels based at least on relative proximity to the downlink.

15. A device, comprising:
wireless circuitry including a receiver and a transmitter configured to communicate over radio channels;
one or more processors; and
one or more storage devices storing computer-readable instructions which, when executed by the one or more processors, cause the one or more processors to:
operate a duplex channel downlink of a duplex radio channel cooperatively with a duplex gap of the duplex radio channel by causing the wireless circuitry to encode data and concurrently transmit the encoded data to another device on:
downlink sub-channels of the duplex channel downlink, and
duplex gap sub-channels of the duplex gap,
the duplex gap separating the duplex channel downlink from a duplex channel uplink of the duplex radio channel.

16. The device of claim 15, wherein the computer-readable instructions, when executed by the one or more processors, cause the one or more processors to:
use different modulation schemes to encode the data on different duplex gap sub-channels.

17. The device of claim 16, wherein the computer-readable instructions, when executed by the one or more processors, cause the one or more processors to:
select the different modulation schemes based at least upon relative proximity of the different duplex gap sub-channels to the duplex channel downlink.

18. The device of claim 15, embodied as a smart phone or tablet.

19. The device of claim 15, embodied as a wireless router.

20. The device of claim 15, wherein the computer-readable instructions, when executed by the one or more processors, cause the one or more processors to:
cause the wireless circuitry to communicate the encoded data by concurrently transmitting the data over the duplex gap sub-channels, the downlink sub-channels, and multiple guard sub-channels that separate the duplex radio channel from another radio channel.

* * * * *